United States Patent
Nakamura et al.

(10) Patent No.: US 8,439,202 B2
(45) Date of Patent: May 14, 2013

(54) COAL ASH TREATMENT METHOD AND APPARATUS

(75) Inventors: Tomomichi Nakamura, Kumagaya (JP);
Hisashi Kondo, Kumagaya (JP);
Shinichiro Saito, Kumagaya (JP)

(73) Assignee: Taiheiyo Cement Corporation, Tokyo (JP)

( * ) Notice: Subject to any disclaimer, the term of this patent is extended or adjusted under 35 U.S.C. 154(b) by 266 days.

(21) Appl. No.: 12/517,071

(22) PCT Filed: Nov. 30, 2007

(86) PCT No.: PCT/JP2007/073146
§ 371 (c)(1),
(2), (4) Date: Jul. 21, 2009

(87) PCT Pub. No.: WO2008/069118
PCT Pub. Date: Jun. 12, 2008

(65) Prior Publication Data
US 2010/0095872 A1    Apr. 22, 2010

(30) Foreign Application Priority Data

Dec. 5, 2006  (JP) ................................ 2006-327870

(51) Int. Cl.
| | |
|---|---|
| *B03D 1/14* | (2006.01) |
| *B03B 5/64* | (2006.01) |
| *B03B 1/00* | (2006.01) |
| *B03B 5/60* | (2006.01) |
| *B07C 5/00* | (2006.01) |
| *C04B 14/00* | (2006.01) |
| *C04B 18/06* | (2006.01) |
| *C01B 31/02* | (2006.01) |
| *F23J 3/00* | (2006.01) |

(52) U.S. Cl.
USPC ........... 209/164; 209/163; 209/169; 209/509; 106/705; 423/461; 110/344

(58) Field of Classification Search ................ 106/745, 106/758, 705; 209/163, 164, 169, 509; 423/461; 110/344
See application file for complete search history.

(56) References Cited

U.S. PATENT DOCUMENTS

| | | | | |
|---|---|---|---|---|
| 6,027,551 | A | * | 2/2000 | Hwang et al. .................. 95/134 |
| 6,210,154 | B1 | * | 4/2001 | Evans et al. .................. 432/106 |

(Continued)

FOREIGN PATENT DOCUMENTS

| | | |
|---|---|---|
| EP | 1219336 | 7/2002 |
| JP | 5344472 | 4/1978 |

(Continued)

OTHER PUBLICATIONS

"Clean Air Mercury Rule". U.S. Environmental Protection Agency. http://www.epa.gov/air/mercuryrule/.*

(Continued)

*Primary Examiner* — Kaj K Olsen
*Assistant Examiner* — Karam Hijji
(74) *Attorney, Agent, or Firm* — Stetina Brunda Garred & Brucker

(57) ABSTRACT

To effectively utilize coal ash while reducing mercury concentration in cement kiln exhaust gas. Coal ash is received from a thermal power plant or the like; the received coal ash is separated into ash and unburned carbon; the separated ash is utilized in a cement manufacturing facility as a cement raw material; and the separated unburned carbon is utilized in the cement manufacturing facility in accordance with mercury concentration in gas exhausted from a cement kiln of the cement manufacturing facility. In case that the mercury concentration in the gas exhausted from the cement kiln of the cement manufacturing facility is high, in the coal ash, unburned carbon with high mercury content can be treated in facilities other than the cement manufacturing facility without feeding the unburned carbon to the cement manufacturing facility, or the quantity of such unburned carbon fed to the cement manufacturing facility can be adjusted. It is possible to separate mercury from the separated unburned carbon, and utilize the unburned carbon from which mercury is separated in the cement manufacturing facility as a fuel.

19 Claims, 1 Drawing Sheet

U.S. PATENT DOCUMENTS

| | | | |
|---|---|---|---|
| 6,328,939 B1 * | 12/2001 | Amrhein | 423/210 |
| 6,872,371 B2 * | 3/2005 | Hakka et al. | 423/239.1 |
| 2007/0199486 A1 * | 8/2007 | Saito et al. | 110/344 |

FOREIGN PATENT DOCUMENTS

| | | |
|---|---|---|
| JP | 5386720 | 7/1978 |
| JP | 61025651 | 4/1986 |
| JP | 61103992 | 5/1986 |
| JP | 61106698 | 5/1986 |
| JP | 2116649 | 5/1990 |
| JP | 3221147 | 9/1991 |
| JP | 044032 | 8/1992 |
| JP | 5238788 | 9/1993 |
| JP | 5293385 | 11/1993 |
| JP | 6157089 | 6/1994 |
| JP | 6335700 | 6/1994 |
| JP | 06063335 | 8/1994 |
| JP | 775720 | 3/1995 |
| JP | 7204604 | 8/1995 |
| JP | 7213950 | 9/1995 |
| JP | 7299331 | 11/1995 |
| JP | 841558 | 2/1996 |
| JP | 8108038 | 4/1996 |
| JP | 08057351 | 5/1996 |
| JP | 09225441 | 2/1997 |
| JP | 9227184 | 9/1997 |
| JP | 09295841 | 11/1997 |
| JP | 9301751 | 11/1997 |
| JP | 10230137 | 9/1998 |
| JP | 11010131 | 1/1999 |
| JP | 11100243 | 4/1999 |
| JP | 11244826 | 9/1999 |
| JP | 11347548 | 12/1999 |
| JP | 200024625 | 1/2000 |
| JP | 2000146458 | 5/2000 |
| JP | 2001198434 | 7/2001 |
| JP | 200268740 | 3/2002 |
| JP | 200296057 | 4/2002 |
| JP | 2002180146 | 6/2002 |
| JP | 2002219335 | 8/2002 |
| JP | 2002282639 | 10/2002 |
| JP | 2002355531 | 12/2002 |
| JP | 2003192407 | 7/2003 |
| JP | 2003266057 | 9/2003 |
| JP | 2003284973 | 10/2003 |
| JP | 200466229 | 4/2004 |
| JP | 2004243154 | 9/2004 |
| JP | 2004313833 | 11/2004 |
| JP | 3613347 | 1/2005 |
| JP | 2005104792 | 4/2005 |
| JP | 2005313009 | 10/2005 |
| JP | 200645006 | 2/2006 |
| JP | 2008143728 | 6/2008 |
| WO | WO2004/052801 | 6/2004 |
| WO | WO 2005035134 A1 * | 4/2005 |
| WO | WO 2006099611 A1 * | 9/2006 |

OTHER PUBLICATIONS

Toshiaki Murata, "Coal Preparation Technology for Moderation of Environmental Pollution," Journal "Doryoku (Power)" No. 248 extra issue, 1998.

Mitsui Engineering & Shipbuilding Co., Ltd., "De-Ashing and De-Sulfurizing Equipment Based on M-COL Technology," Journal, No. 154, 1995.

Mitsui Engineering & Shipbuilding Co., Ltd., "Fine M-COL," Journal, No. 170, 2000.

Mitsui Engineering & Shipbuilding Co., Ltd., "Development of Clean Coal Fuel (M-COL) System," Journal, No. 171, 2000.

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

Yoshio Kasai, Concrete Soran, 1st Edition, Gigutsu Shoin, 1998, p. 36.

* cited by examiner

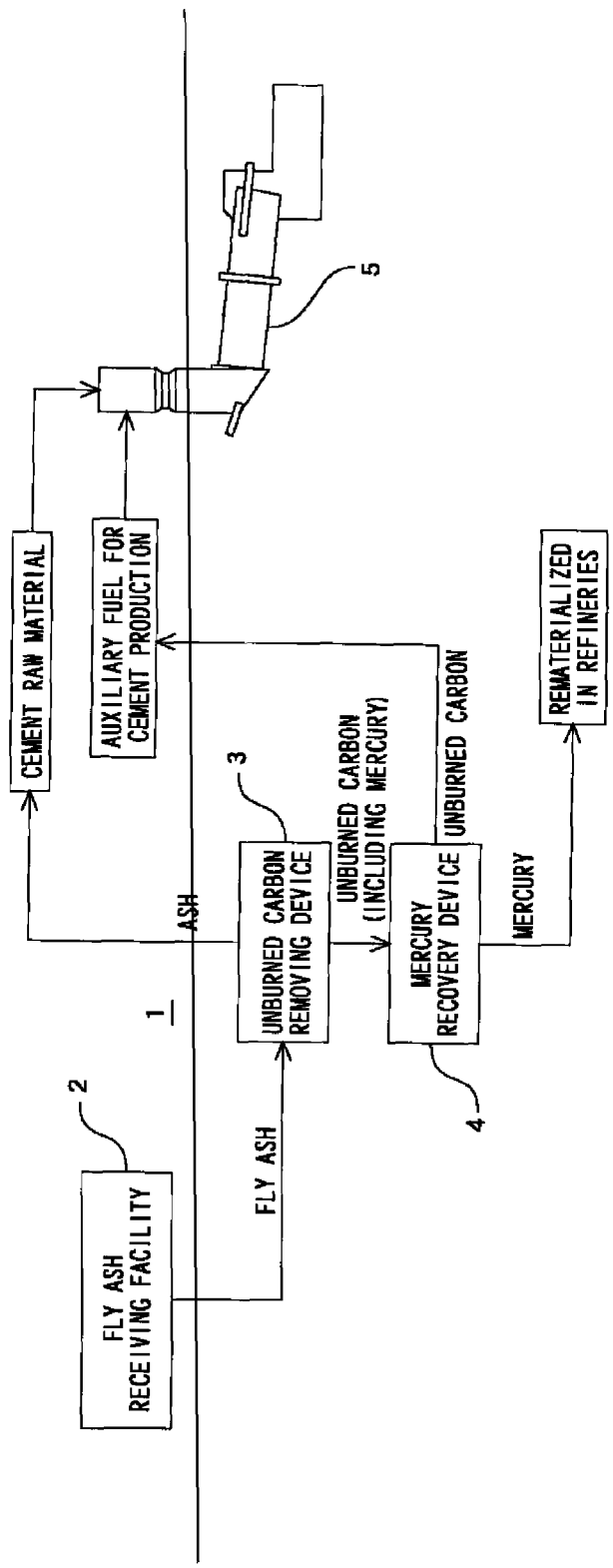

COAL ASH TREATMENT METHOD AND APPARATUS

CROSS-REFERENCE TO RELATED APPLICATIONS

The present application claims priority to International Application No. PCT/JP2007/073146 filed on Nov. 30, 2007, which claims priority to Japanese Patent Application No. 2006-327870 filed on Dec. 5, 2006.

STATEMENT RE: FEDERALLY SPONSORED RESEARCH/DEVELOPMENT

Not Applicable

BACKGROUND OF THE INVENTION

1. Technical Field of the Invention

The present invention relates to a coal ash treatment method and apparatus, and more particularly to the apparatus and the method for effectively utilizing fly ash and the like generated in coal firing power plants, etc. as a cement raw material while reducing mercury concentration in cement kiln exhaust gas.

2. Description of the Related Art

Fly ash generated in coal firing power plants or the like has been used for cement admixture, concrete admixture, raw materials for artificial lightweight aggregates, etc. In these cases, since fly ash containing much unburned carbon causes various problems it is necessary to remove the unburned carbon, so that many techniques have been proposed. Particularly, when fly ash is utilized for cement admixture, it is thought that adding wet ash that is obtained after decarbonization by wet flotation to a cement mill is the best method to reduce costs of equipment and operation.

Therefore, when utilizing fly ash as a cement admixture, the following method was adopted. The method comprises the steps of: generating slurry by adding water to fly ash; adding frothing agent to the slurry; generating air bubbles while agitating the slurry; causing unburned carbon contained in the fly ash to adhere to these air bubbles; removing the unburned carbon from the fly ash by removing the air bubbles; and grinding the fly ash together with clinker by a cement mill (exemplarily described in patent document 1).

Meanwhile, gas exhausted from a cement kiln contains an extremely small amount of metal mercury. Its origin is mercury contained in natural raw material such as limestone as a main raw material for cement as well as mercury contained in various kinds of recycle resources such as fly ash.

In recent years, recycle of wastes by converting to cement raw material and fuel has been promoted, and as the quantity of treated waste increases, mercury concentration in cement kiln exhaust gas has been increasing.

Patent document 1: Japanese Patent No. 3613347 gazette

BRIEF SUMMARY OF THE INVENTION

However, it is very difficult to remove mercury contained in cement kiln exhaust gas at low concentration from a large quantity of exhaust gas, and increase in mercury concentration in the cement kiln exhaust gas may be a cause of air pollution as well as a primary factor impeding enlarged utilization of recycle resources such as fly ash.

The present invention has been made in consideration of the above problems, and the object thereof is to provide a coal ash treatment method and apparatus capable of effectively utilizing coal ash while reducing mercury concentration in cement kiln exhaust gas.

To achieve the above object, the present invention relates to a coal ash treatment method, and the method is characterized by comprising the steps of: receiving coal ash to a cement manufacturing facility; separating the received coal ash into ash and unburned carbon; utilizing the separated ash in the cement manufacturing facility as a cement raw material; and utilizing the separated unburned carbon in the cement manufacturing facility in accordance with mercury concentration in gas exhausted from a cement kiln of the cement manufacturing facility With the present invention, when mercury concentration in exhaust gas from cement kiln of a cement manufacturing facility, in coal ash, unburned carbon to which mercury is unevenly distributed is not fed to the cement manufacturing facility, but the unburned carbon is treated in facilities other than the cement manufacturing facility or feed rate of such unburned carbon to the cement manufacturing facility can be adjusted, which prevents mercury concentration in cement kiln exhaust gas from increasing.

In the above coal ash treatment method, mercury may be separated from the separated unburned carbon, and the unburned carbon from which the mercury is separated can be utilized in the cement manufacturing facility as a fuel. With this method, unburned carbon can effectively be utilized in cement manufacturing facility as a fuel without increasing mercury concentration in the cement kiln exhaust gas.

In this coal ash treatment method, the coal ash can be separated into the ash and the unburned carbon by an electrostatic method or a flotation method.

In the above coal ash treatment method, the mercury can be separated from the separated unburned carbon by thermal desorption with inactive gas or elution separation with oxidant. Further, in this coal ash treatment method, the unburned carbon from which mercury is separated may be utilized as a fuel for a cement kiln or a fuel for drying coal ash after wet decarbonization.

In addition, the above coal ash treatment method may further comprise the step of adsorbing the mercury removed from the unburned carbon to ionic exchange resin or solidifying the mercury by oxidization so as to be rematerialized in refineries.

Further, the present invention relates to a coal ash treatment apparatus, and the apparatus is characterized by comprising: a receiving means for receiving coal ash to a cement manufacturing facility; a first separating means for separating the received coal ash into ash and unburned carbon; a first feeding means for feeding the separated ash to the cement manufacturing facility as a cement raw material; a second separating means for separating mercury from the unburned carbon separated by the first separating means; and a second feeding means for feeding the unburned carbon from which the mercury is removed to the cement manufacturing facility as a fuel.

Then, with this coal ash treatment apparatus, as described above, the ash separated by the first separating means may be utilized in the cement manufacturing facility as a cement raw material, and from the unburned carbon separated by the first separating means can be separate mercury by the second separating means, which makes it possible to utilize unburned carbon from which mercury is removed as a fuel in the cement manufacturing facility without increasing mercury concentration in the cement kiln exhaust gas.

As described above, with the coal ash treatment method and apparatus according to the present invention, coal ash may effectively be utilized while decreasing mercury concentration in cement kiln exhaust gas.

BRIEF DESCRIPTION OF THE DRAWINGS

FIG. 1 is a flow chart showing an embodiment of a coal ash treatment apparatus according to the present invention.

DETAILED DESCRIPTION OF THE INVENTION

Next, an embodiment of the present invention will be explained with reference to a drawing. In the below explanation, fly ash generated in coal firing power plants, etc. is exemplarily introduced as a coal ash that is a target treated by coal ash treatment method and apparatus according to the present invention.

As illustrated in FIG. 1, a coal ash treatment apparatus 1 of the present invention comprises a fly ash receiving facility 2, an unburned carbon removing device 3 and a mercury recovery device 4.

The fly ash receiving facility 2 is for receiving fly ash generated in coal firing power plants, etc. to effectively utilize it in a cement manufacturing facility, and is provided with a pneumatic-pumping-type tank and others.

The unburned carbon removing device 3 is installed to remove unburned carbon from fly ash fed from the fly ash receiving facility 2 by an electrostatic method, a flotation method or the like to obtain ash and unburned carbon.

The mercury recovery device 4 is disposed to recover mercury from the unburned carbon that is departed from the fly ash by the unburned carbon removing device 3, and for instance, a thermal desorption device, an elution separation device and others may be used.

Next, the motion of the coal ash treatment apparatus 1 with the above-mentioned construction will be explained with reference to FIG. 1.

Fly ash from coal firing power plant or the like is received to the fly ash receiving facility 2, and is fed to the unburned carbon removing device 3 through transporters and others.

Next, in the unburned carbon removing device 3 is separated unburned carbon from the fly ash. For example, when adopting a floatation method, a method of removing unburned carbon from fly ash according to Japanese Patent No. 3613347, etc. may be used.

Ash separated by the unburned carbon removing device 3 is fed to a cement burning facility 5 as a cement raw material via transporters and others.

On the other hand, unburned carbon separated by the unburned carbon removing device 3 is fed to the mercury recovery device 4, and mercury is recovered through thermal desorption with inactive gas or the like.

Unburned carbon from which mercury is removed by the mercury recovery device 4 is used in the cement burning device 5 as an auxiliary fuel for cement production. This unburned carbon may be blown to a calciner through a burner, or may be blown to a cement kiln through a main burner. In addition, this unburned carbon can be used as a fuel for cement production as well as a fuel for drying coal ash after wet decarbonization.

Mercury removed by the mercury recovery device 4 may be solidified by adding oxidant so as to be rematerialized in refineries, or the mercury can be recovered by adsorbing it to ionic exchange resin such as chelating resin.

Next, effect of recovering mercury with the coal ash treatment method and apparatus according to the present invention will be explained.

A floatation method causes unburned carbon in fly ash to adhere to air bubbles and to float to separate fly ash slurry into froth containing unburned carbon and tailing containing ash, and mercury contents of those materials are measured. Table 1 below shows results of the measurement. At the measurement of mercury content, Hg, which was dried with wind and finely ground, was analyzed by using heating vaporization atomic absorption method.

As shown in table 1 below, it is confirmed that mercury is unevenly distributed on the froth side that includes unburned carbon. Therefore, for instance, recovering unburned carbon from cake obtained by solid/liquid separating the froth, and without feeding the unburned carbon to the cement manufacturing facility, treating it in a facility other than the cement manufacturing facility, or after removing mercury from the unburned carbon, utilizing the unburned carbon in the cement manufacturing facility as a fuel allows fly ash to effectively be utilized without increasing mercury in cement kiln exhaust gas.

In addition, in case that raw materials used in a cement manufacturing facility is classified into natural raw material in which limestone is a main raw material, fly ash generated in a coal firing power plant or the like and other raw materials, table 2 below shows comparison of the quantity of each raw material used, mercury content, the quantity of mercury delivered and contribution ratio thereof.

As shown in table 2 below, comparing mercury contents, fly ash is the highest and the contribution ratio thereof is 49.2%, so that removing mercury from fly ash allows mercury concentration in kiln exhaust gas of a cement manufacturing facility to be reduced by approximately half.

EXPLANATION OF SIGNALS

| 1 | coal ash treatment apparatus |
| 2 | fly ash receiving facility |
| 3 | unburned carbon removing device |
| 4 | mercury recovery device |
| 5 | cement burning device |

TABLE 1

| Name of sample | Hg[mg/kg] |
| --- | --- |
| Froth | 0.933 |
| Tailing | — |
| Fly ash (original powder) | 0.115 |

Note:
"—" shows below measurable quantity

TABLE 2

| Cement raw material | Quantity used (mass %) | Mercury content | Quantity of mercury delivered | Contribution ratio (%) |
| --- | --- | --- | --- | --- |
| Natural raw material | 81.3 | 1.00 | 81.3 | 41.8 |
| Fly ash | 10.3 | 9.30 | 95.8 | 49.2 |
| Others | 8.4 | 2.09 | 17.6 | 9.0 |

Note:
"Mercury content" shows mercury content of each raw material when that of natural raw material is 1
Quantity of mercury delivered = Quantity used (mass %) × Mercury content

The invention claimed is:

1. A method of treating coal ash comprising the steps of:
   receiving coal ash at a cement manufacturing facility;
   separating the received coal ash into ash and unburned carbon;
   utilizing the separated ash in the cement manufacturing facility as a cement raw material;
   feeding the separated unburned carbon into the cement manufacturing facility, wherein the separated unburned carbon is used in the cement manufacturing facility as a fuel;
   determining the mercury level in the cement kiln exhaust gas;
   adjusting the feed rate of the unburned carbon used as a fuel to the cement manufacturing facility in accordance with the mercury level in the cement kiln exhaust gas, wherein the feed rate of unburned carbon is increased as the mercury level decreases and the feed rate of unburned carbon is decreased as the mercury level increases.

2. The method of treating coal ash as claimed in claim 1, wherein mercury is separated from said separated unburned carbon, and the unburned carbon from which the mercury is separated is utilized in the cement manufacturing facility as a fuel.

3. The method of treating coal ash as claimed in claim 1, wherein said coal ash is separated into the ash and the unburned carbon by an electrostatic method or a flotation method.

4. The method of treating coal ash as claimed in claim 1, wherein said mercury is separated from the separated unburned carbon by thermal desorption with inactive gas or elution separation with oxidant.

5. The method of treating coal ash as claimed in claim 1, wherein said unburned carbon from which mercury is separated is utilized as a fuel for a cement kiln or a fuel for drying coal ash after wet decarbonization.

6. The method of treating coal ash as claimed in claim 1, further comprising the step of adsorbing the mercury removed from the unburned carbon to ionic exchange resin or solidifying the mercury by oxidization so as to be rematerialized in refineries.

7. The method of treating coal ash as claimed in claim 2, wherein said coal ash is separated into the ash and the unburned carbon by an electrostatic method or a flotation method.

8. The method of treating coal ash as claimed in claim 2, wherein said mercury is separated from the separated unburned carbon by thermal desorption with inactive gas or elution separation with oxidant.

9. The method of treating coal ash as claimed in claim 3, wherein said mercury is separated from the separated unburned carbon by thermal desorption with inactive gas or elution separation with oxidant.

10. The method of treating coal ash as claimed in claim 2, wherein said unburned carbon from which mercury is separated is utilized as a fuel for a cement kiln or a fuel for drying coal ash after wet decarbonization.

11. The method of treating coal ash as claimed in claim 3, wherein said unburned carbon from which mercury is separated is utilized as a fuel for a cement kiln or a fuel for drying coal ash after wet decarbonization.

12. The method of treating coal ash as claimed in claim 4, wherein said unburned carbon from which mercury is separated is utilized as a fuel for a cement kiln or a fuel for drying coal ash after wet decarbonization.

13. The method of treating coal ash as claimed in claim 2, further comprising the step of adsorbing the mercury removed from the unburned carbon to ionic exchange resin or solidifying the mercury by oxidation so as to be rematerialized in refineries.

14. The method of treating coal ash as claimed in claim 3, further comprising the step of adsorbing the mercury removed from the unburned carbon to ionic exchange resin or solidifying the mercury by oxidization so as to be rematerialized in refineries.

15. The method of treating coal ash as claimed in claim 4, further comprising the step of adsorbing the mercury removed from the unburned carbon to ionic exchange resin or solidifying the mercury by oxidization so as to be rematerialized in refineries.

16. The method of treating coal ash a claimed in claim 5, further comprising the step of adsorbing the mercury removed from the unburned carbon to ionic exchange resin or solidifying the mercury by oxidization so as to be rematerialized in refineries.

17. The method of treating coal ash as claimed in claim 1, wherein the adjusting step is performed to prevent mercury concentration in the cement kiln exhaust gas from increasing.

18. The method of treating coal ash as claimed in claim 1, wherein the monitoring step includes measuring the mercury levels in the cement kiln exhaust gas.

19. A method of treating coal ash comprising the steps of:
    receiving coal ash at a cement manufacturing facility;
    separating the received coal ash into ash and unburned carbon;
    utilizing the separated ash in the cement manufacturing facility as a cement raw material;
    feeding the separated unburned carbon into the cement manufacturing facility; and
    adjusting the feed rate of the unburned carbon to the cement manufacturing facility in accordance with the mercury level in the cement kiln exhaust gas, wherein the feed rate of unburned carbon is increased as the mercury level decreases and the feed rate of unburned carbon is decreased as the mercury level increaes.

* * * * *